(12) United States Patent
Aciicmez et al.

(10) Patent No.: US 9,058,489 B2
(45) Date of Patent: Jun. 16, 2015

(54) MARKING DOCUMENTS WITH EXECUTABLE TEXT FOR PROCESSING BY COMPUTING SYSTEMS

(75) Inventors: Onur Aciicmez, Santa Clara, CA (US); Shuo Tang, Urbana, IL (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/693,168

(22) Filed: Jan. 25, 2010

(65) Prior Publication Data
US 2011/0185271 A1    Jul. 28, 2011

(51) Int. Cl.
*G06F 17/00* (2006.01)
*G06F 21/56* (2013.01)

(52) U.S. Cl.
CPC ...... *G06F 21/563* (2013.01); *G06F 2221/2119* (2013.01)

(58) Field of Classification Search
CPC .................................................. G06F 21/577
USPC .................................. 715/200, 237, 760, 234
See application file for complete search history.

(56) References Cited

U.S. PATENT DOCUMENTS

| | | | | |
|---|---|---|---|---|
| 6,345,278 | B1 * | 2/2002 | Hitchcock et al. | 1/1 |
| 7,343,626 | B1 * | 3/2008 | Gallagher | 726/25 |
| 7,530,107 | B1 * | 5/2009 | Ono et al. | 726/25 |
| 7,779,399 | B2 * | 8/2010 | Huang et al. | 717/154 |
| 7,899,757 | B1 | 3/2011 | Talan et al. | |
| 7,934,253 | B2 * | 4/2011 | Overcash et al. | 726/22 |
| 8,280,819 | B2 * | 10/2012 | Davis et al. | 705/67 |
| 2006/0075463 | A1 * | 4/2006 | Braddy et al. | 726/1 |
| 2007/0074169 | A1 * | 3/2007 | Chess et al. | 717/126 |
| 2007/0107057 | A1 * | 5/2007 | Chander et al. | 726/22 |
| 2007/0130620 | A1 | 6/2007 | Pietrasezk et al. | |
| 2008/0120722 | A1 * | 5/2008 | Sima et al. | 726/25 |
| 2009/0119769 | A1 * | 5/2009 | Ross et al. | 726/13 |
| 2009/0320135 | A1 | 12/2009 | Cavanaugh | |
| 2011/0185427 | A1 | 7/2011 | Aciicmez et al. | |
| 2013/0111584 | A1 * | 5/2013 | Coppock | 726/22 |

OTHER PUBLICATIONS

Jim et al., "*Defeating Script Injection Attacks with Browser Enforced Embedded Policies*", International World Wide Web Conference Proceedings of the 16th international conference on World Wide Web, Banff, Alberta, Canada, 2007, pp. 601-610.

Van Gundy et al., "*Noncespaces: Using Randomization to Enforce Information Flow Tracking and Thwart Cross-site Scripting Attacks*", Proceedings of the 2009 ICSE Workshop on Software Engineering for Secure Systems, 2009, pp. 33-39.

(Continued)

*Primary Examiner* — Manglesh M Patel
(74) *Attorney, Agent, or Firm* — Sherman IP LLP; Kenneth L. Sherman; Steven Laut

(57) ABSTRACT

Techniques for processing documents with executable text are disclosed. The techniques, among other things, can effectively address XSS attacks to Internet users when browsing web sites. Content deemed not to be trusted or fully trusted ("untrusted") can be marked in a document that can include executable text. Remedial action, including not allowing execution of executable text marked as "untrusted" can be taken. In addition, when the document is processed, content deemed not to be trusted or fully trusted ("untrusted") can be effectively monitored in order to identify executable text that may have been effectively produced by "untrusted" content and/or somehow may have been affected by "untrusted" content.

18 Claims, 11 Drawing Sheets

(56) References Cited

OTHER PUBLICATIONS

Nadji et al., "*Document Structure Integrity: A Robust Basis for Cross-site Scripting Defense*", Proceedings of the Network and Distributed System Security Symposium, NDSS 2009, San Diego, California, USA, Feb. 8-11, 2009.

Van Gundy et al., "Noncespaces: Using Randomization to Enforce Information Flow Tracking and Thwart Cross-Site Scripting Attacks," University of California, Davis, Proceedings of the 16th Annual Network, 2009, isoc.org.

Livshits et al., "Using Web Application Construction Frameworks to Protect Against Code Injection Attacks," PLAS '07, Proceedings of the 2007 Workshop on Programming Languages and Analysis for Security, pp. 95-104, ACM New York, NY, USA, Jun. 14, 2007.

Office Action in U.S. Appl. No. 12/693,152, mailed Aug. 31, 2012.

U.S. Non-Final Office Action for U.S. Appl. No. 12/693,152 mailed Apr. 11, 2014.

U.S. Final Office Action for U.S. Appl. No. 12/693,152 mailed Sep. 11, 2014.

U.S. Final Office Action for U.S. Appl. No. 12/693,152 mailed Jan. 18, 2013.

\* cited by examiner

(i) Web Application

```
String uName =
   request.getParameter("uName");
out.println("<html><body>");
out.println("<script>f()</script>");
out.println("Hi " + uName + "!");
if(uName == "admin")
   out.print("<script>Admin-script()</script>");
else
   out.print("<script>Non-Admin-script()</script>");
out.println("</script>");
out.println("</body></html>");
```

(ii) Benign Access, uName = Alan

1. `<html><body>`
2. `<script>f()</script>`
3. `Hi Alan!`
4. `<script>Non-Admin-script()</script>`
5. `</body></html>`

(iii) Real Page: uName exploited

1. `<html><body>`
2. `<script>f()</script>`
3. `Hi <script>evil();</script>!`
4. `<script>Non-Admin-script()</script>`
5. `</body></html>`

FIG. 6A

(i) Web Application

```
String uName =
    request.getParameter("uName");
out.println("<html><body>");
out.println("<script>f();</script>");
out.println("Hi " + uName + "!");
if(uName == "admin")
    out.print("<script>Admin-script()");
else
    out.print("<script>Non-Admin-script()");
out.println("</script>");
out.println("</body></html>");
```

(ii) Benign Access, uName = Alan

1. `<html><body>`
2. `<script>f();</script>`
3. Hi Alan!
4. `<script>Non-Admin-script()</script>`
5. `</body></html>`

(iii) Real Page: uName exploited

1. `<html><body>`
2. `<script>f();</script>`
3. `Hi <script>evil();</script>!`
4. `<script>Non-Admin-script()</script>`
5. `</body></html>` out.println("Hi <userinput length=" + uName.length + "> " + uName + "</userinput>!");

3.  Hi <userinput length=24> `<script>evil();</script>` </userinput> !

<u>Exactly 24 characters</u>

FIG. 6B

MARKING DOCUMENTS WITH EXECUTABLE TEXT FOR PROCESSING BY COMPUTING SYSTEMS

CROSS-REFERENCE TO RELATED APPLICATIONS

This application is related to U.S. patent application Ser. No. 12/693,152 filed on Jan. 25, 2010, entitled "SAFELY PROCESSING AND PRESENTING DOCUMENTS WITH EXECUTABLE TEXT," filed concurrently herewith and hereby incorporated by reference herein in its entirety.

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program), effectively describing how to process the information. Typically, the information is stored in a computer readable medium in a binary form. More complex computing systems can store content including the computer program itself. A computer program may be invariable and/or built into, for example, a computer (or computing) device as logic circuitry provided on microprocessors or computer chips. Today, general purpose computers can have both kinds of programming. Storing content (or information retention) is of one the core functions of computing devices. Today, numerous types of computing devices are available. These computing devices range widely with respect to size, cost, amount of storage, and processing power. The computing devices that are available today include: expensive and powerful servers, relatively cheaper personal computers (PC's) and laptops, and less expensive microprocessors (or computer chips) provided in storage devices, automobiles, and household electronic appliances.

Today, the Internet is widely used for various applications and the general public by and large is familiar with accessing content via the Internet, especially from numerous commercial and public web sites that have become available over the years. Typically, a web browser (e.g., Internet Explorer, Mozilla Firefox) is used to interact with the Internet. A web browser can, for example, be provided as a software application for retrieving, presenting, and traversing information resources on the World Wide Web. An information resource (e.g., a web site) can be identified by a Uniform Resource Identifier (URI). An information resource can, for example, include images, video, text and other forms of content. Hyperlinks can be present in a resource and can enable users to easily navigate their browsers to related resources.

HyperText Markup Language (HTML) is the predominant markup language for web pages. HTML can be used to create structured documents by denoting structural semantics for text (e.g., headings, paragraphs, lists) as well as for links, quotes, and other items. HTML also allows images and objects to be embedded and used to create interactive forms. Typically, a web page is written in the form of HTML elements consisting of "tags" surrounded by angle brackets within the web page content.

Original web browsers were static in nature, designed to only render hyperlinked documents in a relatively straightforward manner. Later, scripting protocols such as JavaScript were developed, which, among other things, allowed scripts to be embedded in a resource in order to provide simpler dynamic functionality to support user interactions and animated menus.

AJAX, which is an acronym for Asynchronous JavaScript and Extensible Markup Language (XML) can be considered as a group of interrelated web development techniques used on a client-side to create interactive web applications. It is generally believed that the use of AJAX techniques has led to a dramatic increase in interactive or dynamic interfaces on web pages. Today, AJAX applications can rival desktop applications when it comes to speed and performance.

Today, processing a webpage with executable code (e.g., JavaScript) can be relatively complex and has resulted in development of relatively more complex web browsers over the years. To illustrate this complexity, FIG. 1A depicts the simplified operations of a typical web browser. Referring to FIG. 1A, a resource (e.g., a web page) is downloaded from a web server 10. Images from the web page are separated out by an image separator 12. The web page is then fed to a document object model (DOM) parser 14, which parses the web page into a DOM data structure (e.g., a DOM tree) 16. The DOM data structure 16 can represent an abstract syntax tree of the document. Content referenced by the web page is then fetched from the web server 10 and in-lined into the DOM. As the content necessary to display the page is downloaded and decompressed, the web page becomes available for viewing. Typically, the web page layout is incrementally solved and drawn to the screen. A layout module 18 performs the laying out of the elements of the web page, along with images decoded by image decoder 11. A rendering module 20 then renders the web page in the browser window.

After the initial page load, scripts (e.g., JavaScripts) 15 respond to events (e.g., events generated by user input or server messages). It should be noted that the scripts 15 can then rewrite the DOM data structure 106 based on the events. This, in turn, causes the page layout to be recomputed and redrawn.

Generally, loading an HTML page can set off a cascade of events: the HTML page is scanned, parsed and compiled into a document object model (DOM) which can be an abstract syntax tree of the document. Content referenced by URLs can be fetched and in-lined into the DOM. As the content necessary to display the page becomes available, the page layout can be incrementally solved and drawn to the screen. After the initial loading of the HTML page, scripts can respond to events generated, for example, by user input and server messages, typically modifying the DOM. This may, in turn, cause the HTML page layout to be recomputed and redrawn.

Today, Web pages/applications are typically written in HTML language. Below is a very simple HTML page as an example:

```
<HTML>
    <HEAD>
        <TITLE>My first HTML document</TITLE>
    </HEAD>
    <BODY>
        <P>Hello world!
    </BODY>
</HTML>
```

When a browser obtains this simple HTML page from a web server, it tokenizes the page first. A "lexer/tokenizer" can process the page (usually character by character) and extract its tokens. The tokens of the example above are: "<HTML>", "<HEAD>", "<TITLE>", "My first HTML document", "</TITLE>", "</HEAD>", "<BODY>", "<P>", "Hello world!", "</BODY>", and "</HTML>" A parser can use these tokens to construct a DOM tree and to checks the validity of the document, for example, by using push-down automaton as is generally known in the art. To elaborate even further, the structure of the DOM-tree for the exemplary HTML page is provided in FIG. 1B.

Popularity of web pages and more generally documents that include executable and non-executable content are evidenced by their ever increasing use in everyday life. Accordingly, improved techniques for processing or presenting them would be highly useful.

SUMMARY OF THE INVENTION

Broadly speaking, the invention relates to computing systems and computing environments. More particularly, the invention pertains to improved techniques for marking documents that can include executable text. The techniques, among other things, can effectively address XSS attacks posing a serious threat to Internet users, especially when browsing documents that can include both executable and non-executable.

In accordance with one aspect of the invention, before a document is made available content deemed not to be trusted or not fully trusted ("untrusted") can be marked in a document that can include executable text. The marking of the document allows the "untrusted" text to be identified solely based the document. Remedial action, including not allowing execution of executable text marked as "untrusted" text can be taken. In addition, when the marked document is processed, content deemed not to be trusted or fully trusted ("untrusted") can be effectively monitored in order to identify code that may have been effectively produced by "untrusted" content and/or somehow may have been affected by "untrusted" content. By way of example, executable text (e.g., script) that may have been effectively produced and/or affected by text marked as "tainted" text in a web page can be identified to be also "tainted" when the web page is processed or is being processed.

For example, in accordance with a method provided in one embodiment of the invention, a document can be marked by a first computing system (e.g., a server device). More specially, text not trusted or not fully trusted can be marked in the document that can include executable text as "untrusted" text, thereby allowing a second computing system to identify the "untrusted" text solely based on the marked document.

It should be noted that the second computing system can process the document by determining whether executable text in the document has been derived from and/or affected by "untrusted" content in the document. As a result, executable text can be identified as "untrusted" content when it is determined that executable text has been derived from or has been affected by "untrusted" text.

The second computing system may be operable to deny execution of the executable text that has been identified as "untrusted" text.

As another example, a computer readable storage medium can store at least executable computer code to perform the exemplary method noted above.

As yet another example, a communication or computing environment can be provided in accordance with one embodiment of the invention. In the communication or computing environment, a first computing system (e.g., server) can be operable to mark text in a document as "untrusted" text before the document is made available to a second computing system (e.g., client) operable to identify the "untrusted" text and take appropriate action. In a hybrid approach, the second computing system can also be operable to track the "untrusted" text and identify content derived and/or affect by the "untrusted" text when the document is processed.

A document can, for example, be a web page that can be obtained a client device via the Internet. Text in the web page can be marked as "tainted" text by a server device. By way of example, text associated with input or other sources considered to be suspicious can be marked as "tainted" text. In any case, a client device can be operable to obtain the web page and identify "suspicious" text marked in the document as "tainted" text solely based on the document (i.e., without requiring external information). In a hybrid-approach, the client device may also be operable to effectively track the "tainted" text and mark any executable text that may have been derived or affected by the "tainted" text. By way of example, text can be considered to be "tainted" when the text is affected by or derived from "tainted" text as result of an assignment operation, an arithmetic or logical operation, a function call, and/or a control flow operation. It will be appreciated that the "tainted" mark may also be stored and tracked in DOM trees to keep track of any modifications made by tainted data.

The invention can be implemented in numerous ways, including, for example, a method, an apparatus, a computer readable (and/or storable) medium, and a computing system (e.g., a computing device). A computer readable medium can, for example, include and/or store at least executable computer program code stored in a tangible form. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 6A depicts a very simple web application that can generate a web page using an input parameter, namely, a "uName" parameter.

FIG. 6B depicts use of a new HTML tag and length attribute in a web application in accordance with one embodiment of the invention.

DETAILED DESCRIPTION OF THE INVENTION

Figure 1A:
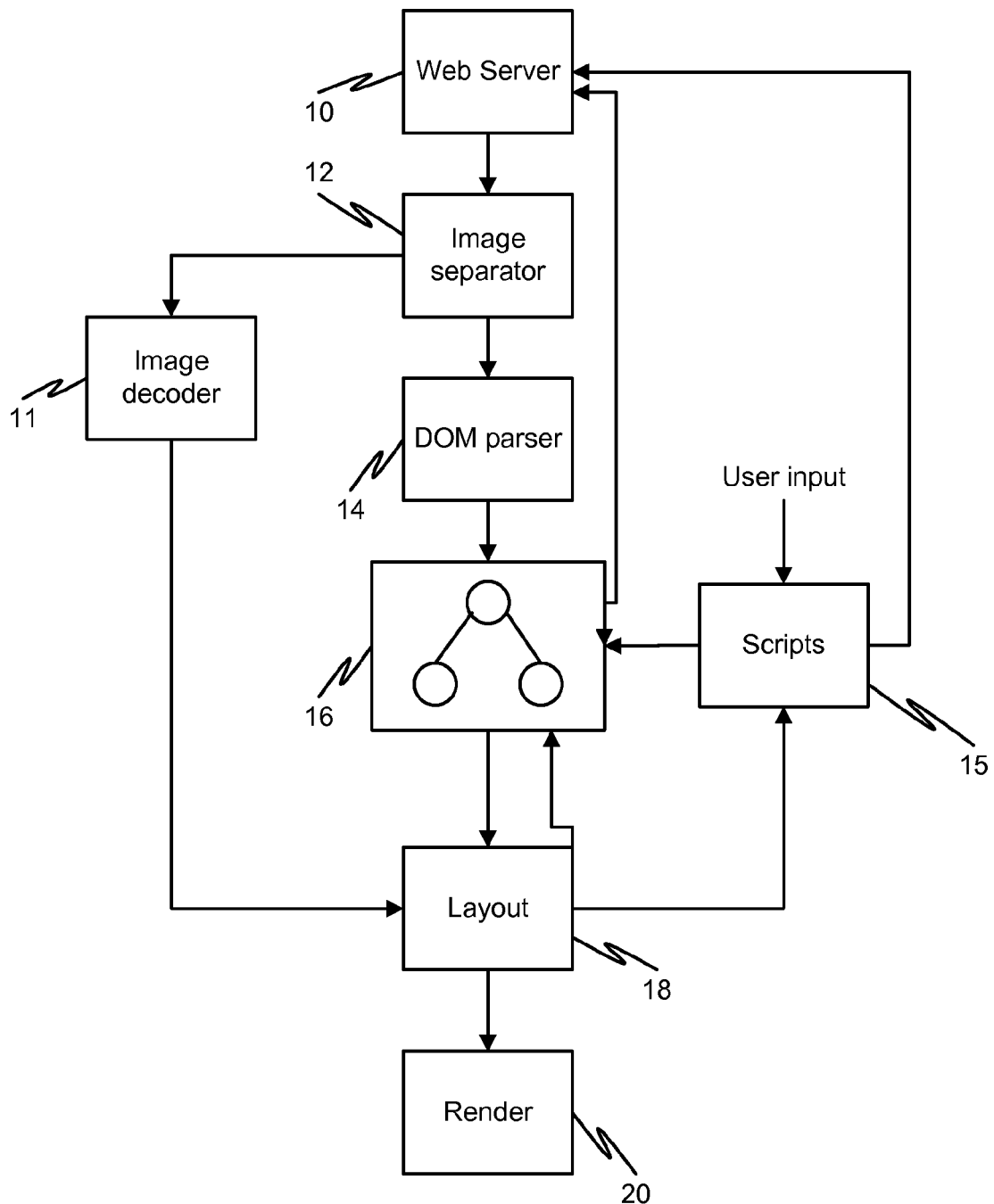
FIG. 1A depicts the simplified operations of a typical web browser.
Figure 1B:
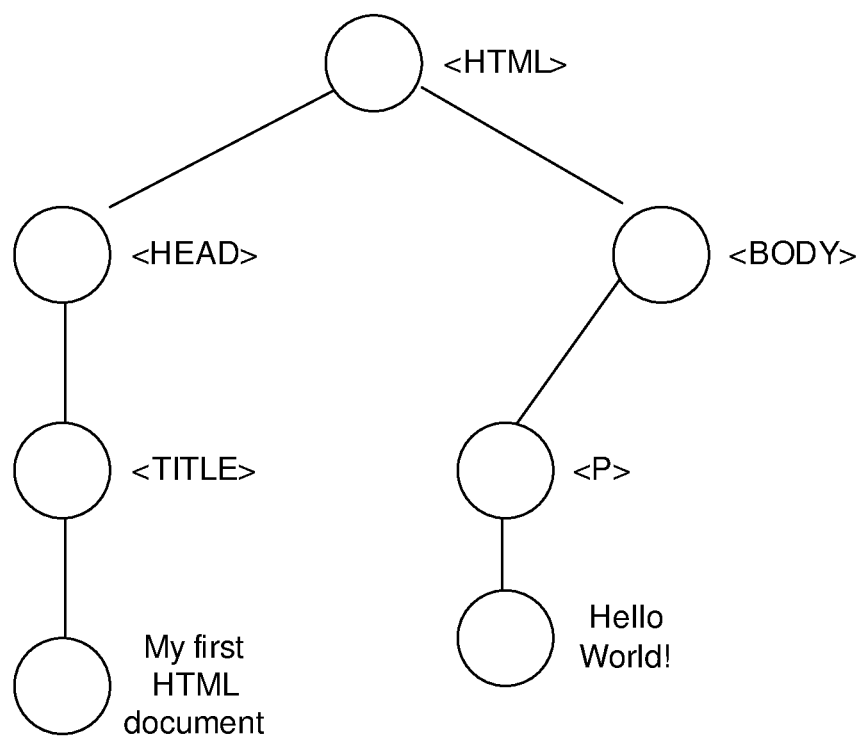
FIG. 1B depicts a structure of a document object model (DOM) tree for an exemplary HTML page.

As noted in the background section, providing content in a form that can include both executable and non-executable content is very useful. Today, predominately, web pages provide various forms of non-executable content as well as executable code primarily in the form of a script (e.g., JavaScript).

Referring to the discussion in the background section regarding processing a web page, use of JavaScript and DOM allow delivery of illegitimate and often malicious executables in the form of script to client computers via the Internet. As an example, a common JavaScript-related security problem is cross-site scripting ("XSS") where malicious entities (attackers) can inject HTML code or client script code (e.g., JavaScript) to a web page that could be viewed by numerous other entities (victims). The injected code can run in the same origin of target page in order to bypass the popular security policy enforced in contemporary browsers—same origin policy. Thus, an attacker could execute code to steal information from a victim or perform actions on behalf of victim unbeknownst to an unsuspecting victim.

Today, at least three (3) types of XSS attacks can be identified:
a) Persistent attacks: attackers inject malicious code into a Web application in the server side and are able to affect all the users that use the Web application. Typical examples are public Internet forums or Wiki-like sites. Attacker could submit content of JavaScript (which should be plain text or legitimate HTML code) to web servers and every user browses the site would be subjected to the attack of the malicious JavaScript code.
b) Reflective attacks: user data can be used to generate a temporary page sent back to the same user. If the user supplied data is not properly sanitized and it contains, for example, malicious JavaScript code, the user can be subject to reflective XSS attack. In a simple attack scenario, the attacker could foul the victim to click a URL with a malicious payload that can be delivered in a Web page to the victim.
c) DOM-based attacks: this type of XSS can be similar to reflective attack and may have been mostly overlooked. Instead of generating a malicious page by the server side logic (e.g., a PHP), attackers can leverage client side logic to effectively deliver attack code.

In view of these serious threats to security, improved techniques for processing web pages would very useful. More generally, improved techniques for processing documents that can include both executable and not executable content are needed especially given the usefulness of these documents.

It will be appreciated that improved techniques for marking documents that can include both executable and not executable content are disclosed. The techniques, among other things, can effectively address XSS attacks posing a serious threat to Internet users.

In accordance with one aspect of the invention, before a document is made available content deemed not to be trusted or not fully trusted ("untrusted") can be marked in a document that can include executable text. The marking of the document allows the "untrusted" text to be identified solely based the document. Remedial action, including not allowing execution of executable text marked as "untrusted" text can be taken. In addition, when the marked document is processed, content deemed not to be trusted or fully trusted ("untrusted") can be effectively monitored in order to identify code that may have been effectively produced by "untrusted" content and/or somehow may have been affected by "untrusted" content. By way of example, executable text (e.g., script) that may have been effectively produced and/or affected by text marked as "tainted" text in a web page can be identified to be also "tainted" when the web page is processed or is being processed.

For example, in accordance with a method provided in one embodiment of the invention, a document can be marked by a first computing system (e.g., a server device). More specially, text not trusted or not fully trusted can be marked in the document that can include executable text as "untrusted" text, thereby allowing a second computing system to identify the "untrusted" text solely based on the marked document.

It should be noted that the second computing system can process the document by determining whether executable text in the document has been derived from and/or affected by "untrusted" content in the document. As a result, executable text can be identified as "untrusted" content when it is determined that executable text has been derived from or has been affected by "untrusted" text. The second computing system may be operable to deny execution of the executable text that has been identified as "untrusted" text.

As another example, a computer readable storage medium can store at least executable computer code to perform the exemplary method noted above.

As yet another example, a communication or computing environment can be provided in accordance with one embodiment of the invention. In the communication or computing environment, a first computing system (e.g., server) can be operable to mark text in a document as "untrusted" text before the document is made available to a second computing system (e.g., client) operable to identify the "untrusted" text and take appropriate action. In a hybrid approach, the second computing system can also be operable to track the "untrusted" text and identify content derived and/or affect by the "untrusted" text when the document is processed.

A document can, for example, be a web page that can be obtained a client device via the Internet. Text in the web page can be marked as "tainted" text by a server device. By way of example, text associated with input or other sources considered to be suspicious can be marked as "tainted" text. In any case, a client device can be operable to obtain the web page and identify "suspicious" text marked in the document as "tainted" text solely based on the document (i.e., without requiring external information). In a hybrid-approach, the client device may also be operable to effectively track the "tainted" text and mark any executable text that may have been derived or affected by the "tainted" text. By way of example, text can be considered to be "tainted" when the text is affect by or derived from "tainted" text as result of an assignment operation, an arithmetic or logical operation, a function call, and/or a control flow operation. It will be appreciated that the "tainted" mark may also be stored and tracked in DOM trees to keep track of any modifications made by tainted data.

Generally, it will be appreciated that the described techniques are highly effective against XSS attacks including DOM-based XSS attacks.

Embodiments of these aspects of the invention are discussed below in greater detail with reference to FIGS. 2A-6B. However, those skilled in the art will readily appreciate that the detailed description given herein with respect to these figures is for explanatory purposes as the invention extends beyond these limited embodiments.

Figure 2A:
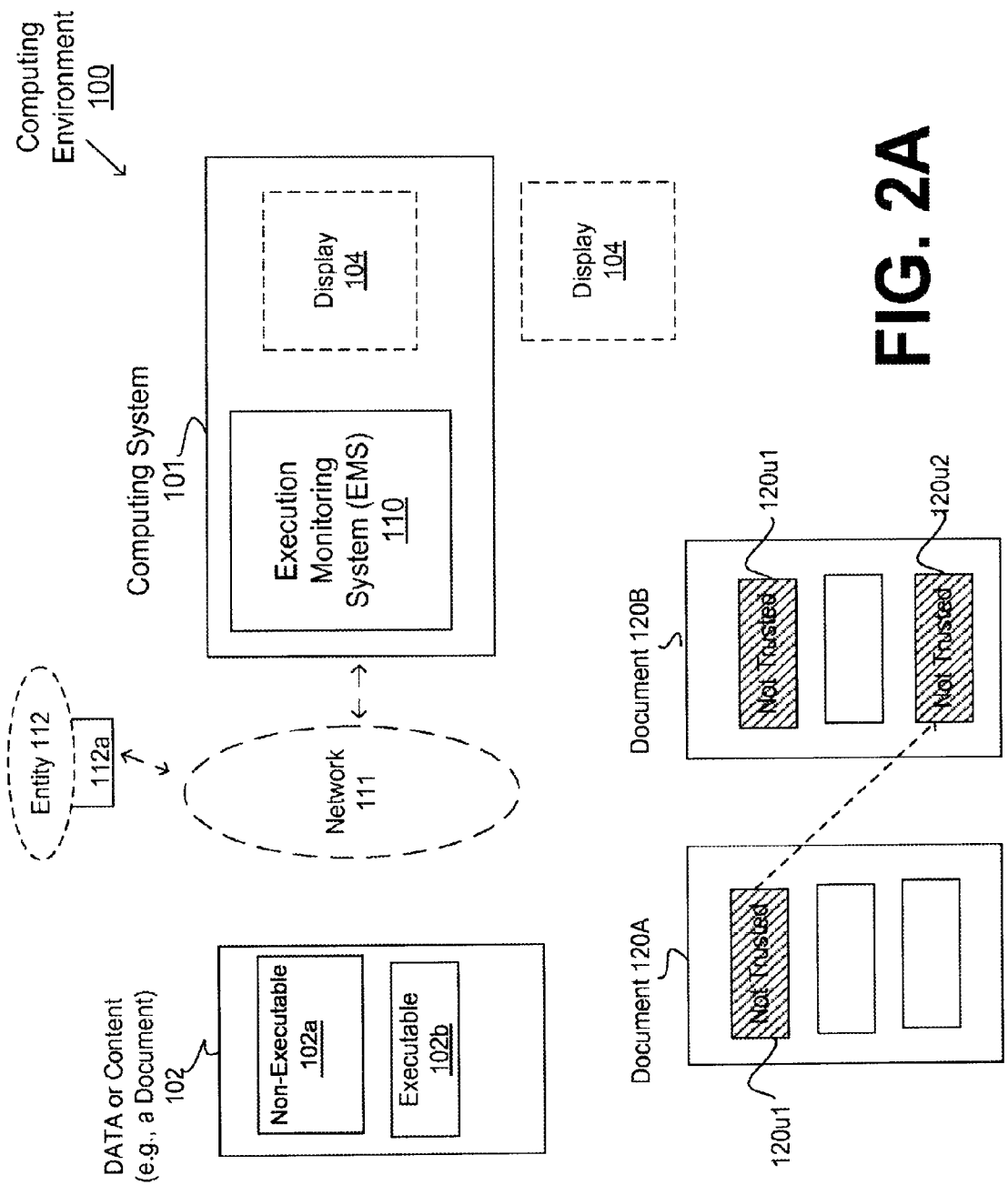
FIG. 2A depicts a computing environment in accordance with one embodiment of the invention.

FIG. 2A depicts a computing environment 100 in accordance with one embodiment of the invention. Referring to FIG. 2A, a computing system 101 can be operable to process data (or content) 102 as input (or input data). As will be appreciated by those skilled in the art, processing of data 102 can, for example, entail layout, rendering and/or displaying non-executable content 102a (e.g., non-executable text, images) on a display 104 that may or may not be part of the computing system 101. The processing of the data 102 by the computing system 101 can also entail execution of executable code (e.g., executable text, script) 102b. Generally, non-executable content 102a can be displayed or rendered on a display 104 and executable code 102b can be executed when the input data 102 is processed or is being processed by the computing system 101. Data 102 can, for example, be a document (e.g., a web page) that includes both non-executable content and executable code.

It should be noted processing the data 102 using conventional techniques may result in execution of illegitimate executable code. By way of example, when data 102 is a Webpage, an illegitimate script can be injected into the data 102 in a XSS attack. It should also be noted that an illegitimate script can be effectively generated during the processing of the data 102 as a result of insertion of illegitimate content that may not be necessarily executable content. This means that during the processing of data 102, illegitimate executable code can effectively replace legitimate executable code or non-executable content. In other words, processing of data 102 may be subject to injection of illegitimate and potentially harmful executable code. Today, this type of code injection is prevalent in the context of documents (e.g., web pages) that can include executable text typically in the form of a script, as well as displayable but non-executable content. As such, the computing environment 100 will be discussed in greater detail in the context of the input data 102 being provided as a document (102) that can include executable text and non-executable content (e.g., non-executable text, graphics).

Referring back to FIG. 2A, data 102 can, for example, be provided as a document (102) by another entity 112 (e.g., an organization, a company, an individual). This document (102) can, for example, be made available and accessed by various computing systems, including computing system 101 via a computer network 111 (e.g., the Internet) through a computing system 101 or device 102a (e.g., a server, a web server) associated with the entity 112. As such, illegitimate code may be effectively injected into this document (102) and executed when the document is being processed by, for example, operating on the computing system 101. The computing system 101 can, for example, be a computing device (e.g., a Personal Computer, a Smartphone) with one or more processors and/or processing cores (not shown), computer readable storage medium, including volatile and non-volatile memory (not shown) as will be readily known to those skilled in the art.

It will be appreciated that an Execution Monitoring System (EMS) 110 can be operable to effectively monitor execution of executable code in the document 102. More particularly, EMS 110 can effectively monitor and/or track content in the document 102 that is not trusted or fully trusted ("untrusted content") to identify executable text that has been originated or affected by the untrusted content. Generally, content of the document 102 can be identified or marked as "untrusted" content (or content not trusted or fully trusted) before processing the document 102. As will be described below, the EMS 110 and/or computing system 101 may also be operable to identity and mark "untrusted" content in the document 102. Alternatively, or in addition to "untrusted" content identified by the EMS 110 or computing system 101, "Untrusted" content may already be marked (or pre-marked) in the document 102, for example, by the other entity 112 as will be discussed in greater detail below.

To further elaborate, referring to FIG. 2A, "untrusted" content 120u1 can be marked (or pre-marked) in a document 120A. When the document 120A is being processed, the EMS 110 can determine whether the "untrusted" content 120u1 has originated and/or affected other content in the document 120. As a result, during the processing of the document 120A, EMS 110 may also mark other content (120u2) as "untrusted" content in the document 120A. The resulting document is depicted as document 120B in FIG. 2A. Prior to execution of executable text, the EMS 110 can determine whether the executable text has been marked as "untrusted" in the document 120 and appropriate or remedial action, including not allowing the execution of any executable text marked as "untrusted" can be taken. As a result, EMS 110 may not allow execution of executable text associated with "untrusted" content 120u1 and 120u2.

Figure 2B:
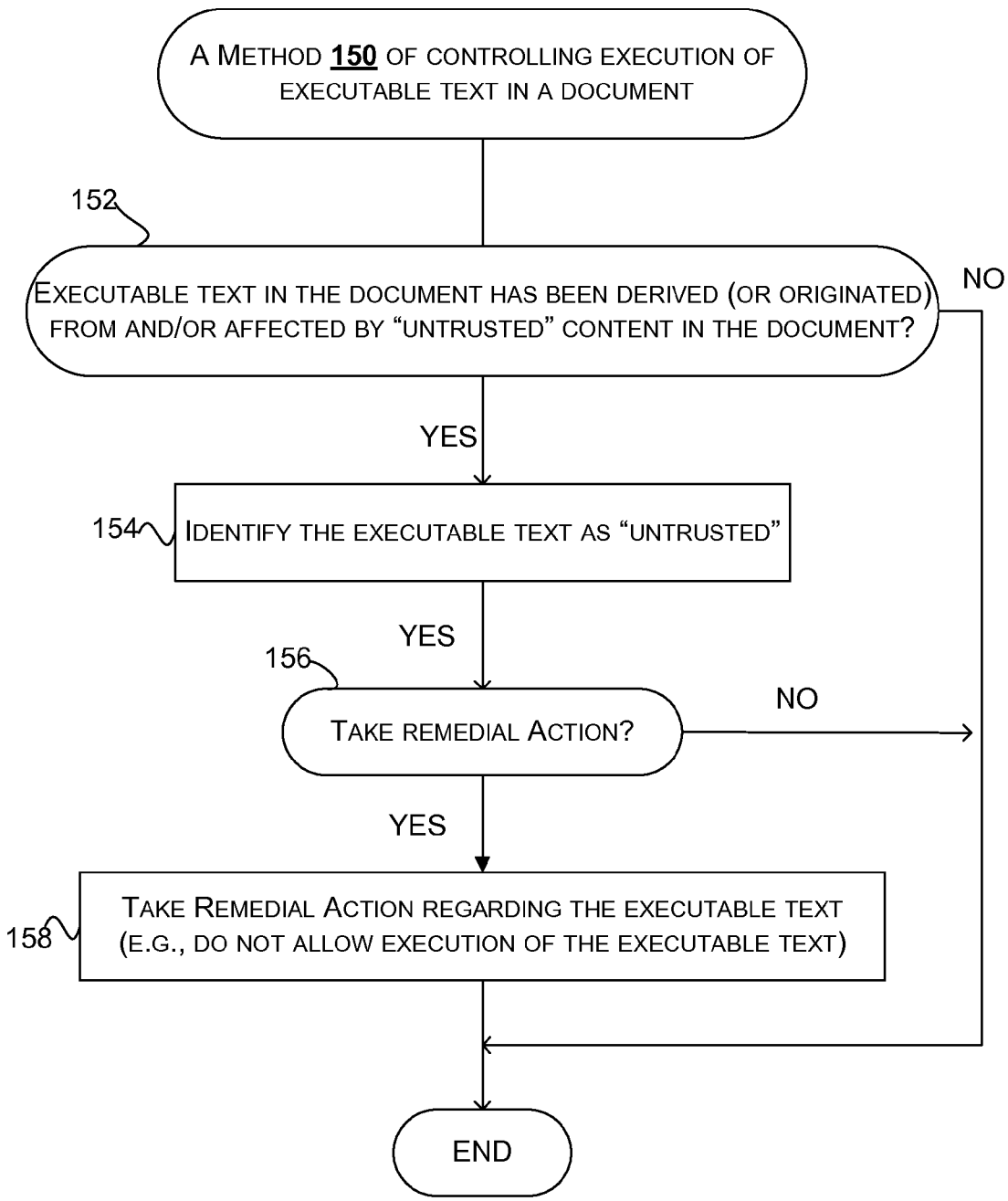
FIG. 2B depicts a computer-implemented method for controlling execution of executable text in a document in accordance with one embodiment of the invention.

To elaborate even further, FIG. 2B depicts a computer-implemented method 150 of controlling execution of executable text in a document in accordance with one embodiment of the invention. It should be noted that the document can include non-executable content (e.g., non-executable text, an image) and executable text (e.g., a script). Method 150 can, for example, be performed by the EMS 110 (shown in FIG. 1A).

Referring to FIG. 2B, initially, it is determined (152) whether executable text in the document has been derived (or originated) from and/or affected by "untrusted" content in the document. Typically, the determination (152) is performed when the document is processed or is being processed and the "untrusted" content includes content not trusted or not fully trusted. If it is determined (152) the executable text in the document has not been derived from or affected by "untrusted" content in the document, the method 150 can end.

However, if it is determined (152) that the executable text in the document has been derived from or affected by "untrusted" content in the document, the executable text can be identified (154) as "untrusted" executable and it can be determined (156) whether to take remedial action regarding execution of the executable text. This determination (156) can, for example, represent a design choice or can be made based on one or more criteria (e.g., preference or input provided by a user). Accordingly, Remedial action can be taken (158) if it determined (156) to take remedial action regarding the executable text identified to be "untrusted." Remedial action can, for example, include not allowing execution of the executable text, displaying the executable text or displaying whit spaces instead of executing the executable text. Method 150 can end after remedial action is taken or it can end without taking remedial action if it is determined (156) not to take remedial action.

As noted above, executable code and non-executable content can be presented in a form of a document. One example of such a document is a web page that can typically have non-executable text and executable text (e.g., script). Given the prevalence of such documents, especially web pages in various computing environments and system that are available today, an Execution Monitoring System (EMS) suitable for computing environments that process documents is discussed in greater detail below.

Figure 3A:
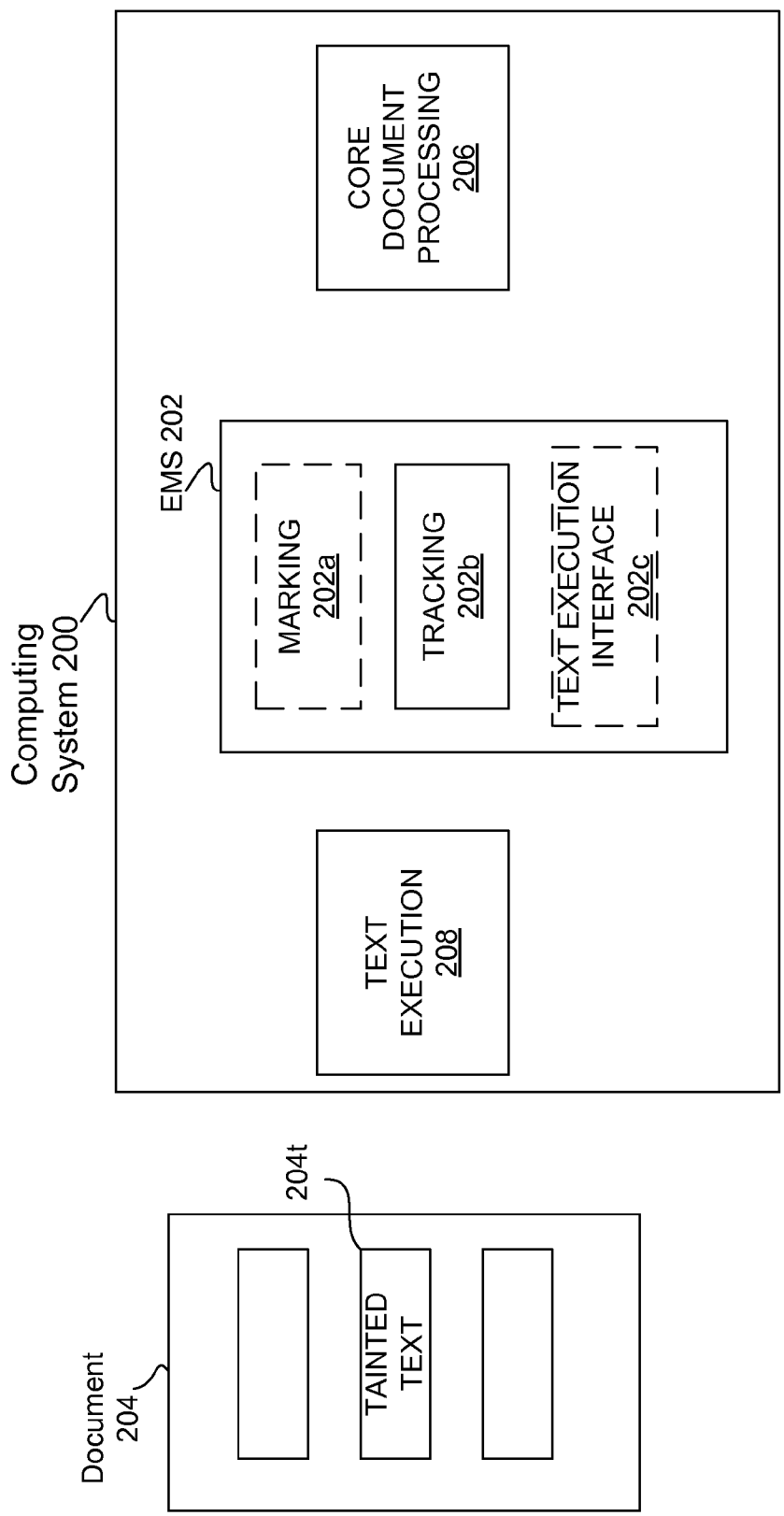
FIG. 3A depicts an Execution Monitoring System (EMS) provided for a computing system in accordance with another embodiment of the invention.

More specifically, FIG. 3A depicts an Execution Monitoring System (EMS) 202 provided for a computing system 200 in accordance with another embodiment of the invention. Referring to FIG. 3A, the computing system 200 is operable to process a document 204. It should be noted that the document 204 can include non-executable text and executable text. As will be appreciated by those skilled in the art, a core document processing component 206 (or module) can be generally operable to process the document 204 and cause content including non-executable text provided in the document to be displayed on a display (not shown). In addition, a text execution component 208 can effectively execute executable text in the document 202 during the processing of the document 204. Conceptually, EMS 202 can include one or more components, namely a marking component 202a, tracking component 202b, and a text-execution interface 202c. Generally, marking component 202a can identify and mark text in the document 204 that is not trusted or not fully trusted as "tainted text" 204t. Content including text that can be altered or easily altered in the document 204 can be identified and marked as tainted text by the marking component 202a. For example, text corresponding to input or input data (e.g., user input) can be identified as text that can be easily altered by an attacker.

It should be noted that the document 204 can be premarked with "tainted" text 204t. As such, the EMS 202 may be operable without the marking component 202a. The marking component 202a may also be used to supplement or augment identification and marking of text as "tainted text" 204t. It should be noted that the "tainted text" 204t does not have to be a part of a "static" document or marked in a persistent manner. Marking component 202a can be operable to mark text in a "tainted text" 204t in dynamic manner and/or temporary manner. For example, a web application may initially contain no "tainted" text in its original form, but when a user downloads it to start using it, the user may type text as input to the web application. Marking component 202a can mark the input provided by the user as "tainted text" 204t even though the original document 204 may not have contained any tainted text. In this case, "tainted text" 204t does not have to reside in memory in a persistent manner and the "tainted text" 204t does not have to be a permanent part of the document 204. As a result, "tainted text" 204t" corresponding to user input may not be present when the same web application is opened again.

In any case, the tracking component 202b can effectively propagate the "tainted" mark of the "tainted text" 204t to other text in the document as a result of interaction with the "tainted text" 204t. More specifically, it can be determined whether other text representative of data (e.g., variables, parameters, values) has been derived and/or affected by the "tainted text" 204t or has been "tainted" as a result of interacting with the "tainted text" 204t as will be appreciated by those skilled in the art. By way of example, data representative of a variable, parameter and/or value can be derived, as a result of an assignment involving "tainted" text representative of a "tainted" variable, parameter and/or value. Text-execution interface 202c can be optionally provided to interface with the text-execution component 208 in order to identify executable text that is marked as "tainted" before the text-execution component 204 executes the executable text. Text-execution interface 202c may also be operable to determine remedial action to be taken in lieu of execution of "tainted" text 204t. By way of example, the interface 202c may determine to display the "tainted" executable text 204t as non-executable text and communicate with the core document processing 206 to achieve displaying of the "tainted" executable text 204t instead of allowing the text-execution component 208 to execute the "tainted" executable text. The components of the EMS 202 may be effectively distributed between the core document processing 206 and text-execution component 208 as will be readily known to those skilled in the art.

Figure 3B:
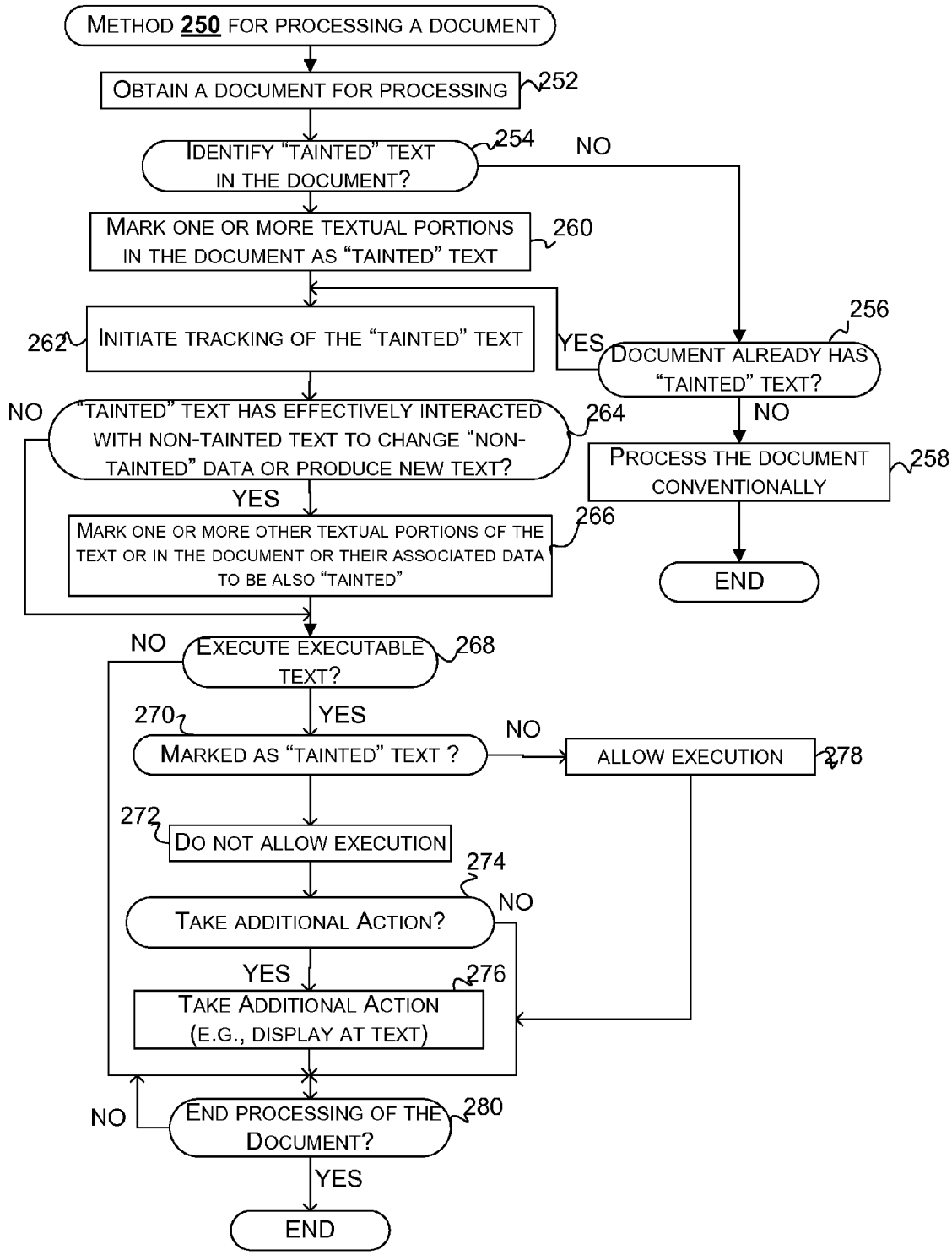
FIG. 3B depicts a method for processing a document in accordance with one embodiment of the invention.

To further elaborate, FIG. 3B depicts a method 250 for processing a document in accordance with one embodiment of the invention. Referring to FIG. 3B, initially, a document that can include both executable text and non-executable content (e.g., non-executable text) is obtained (250). Next, it is determined (252) whether to identify text in the document to be marked as "tainted" text. As will be appreciated by those skilled in the art, this determination can represent a design choice or can be made based on one or more criteria (e.g., the type of the document, user input or preference). If it is determined (252) not to identify text for marking as "tainted" text, it can be determined (256) whether the document already includes text marked as "tainted" text. If it is determined (256) that the document does not include "tainted" text, the document can be processed (258) conventionally before the method 250 ends.

However, if it is determined (252) to identify text in the document to be marked as "tainted" text, one or more textual portions of the document can be marked (260) as "tainted text" and tracking of the tainted text can be initiated (262) before allowing text to be executed. More particularly, it is determined (264) whether "tainted" text or data associated with it has effectively interacted with "non-tainted" text or data associated with 'non-tainted" text. As a result, one or more textual portion of the document or their associated data can be marked (266) to be "tainted" text or data.

During the processing of the document, it can be determined (268) whether executable text is to be executed. However, if it is determined (270) that the executable text is marked to be "tainted," the executable text is not allowed to be executed (272) and additional action may be taken (276) if it determined (274) to take additional action. For example, executable text may be displayed or logged. Executable text not marked as "tainted" can be allowed (278) to execute. The method 250 can proceed to process the document until if is determined (280) to end the processing of the document.

Figure 4:
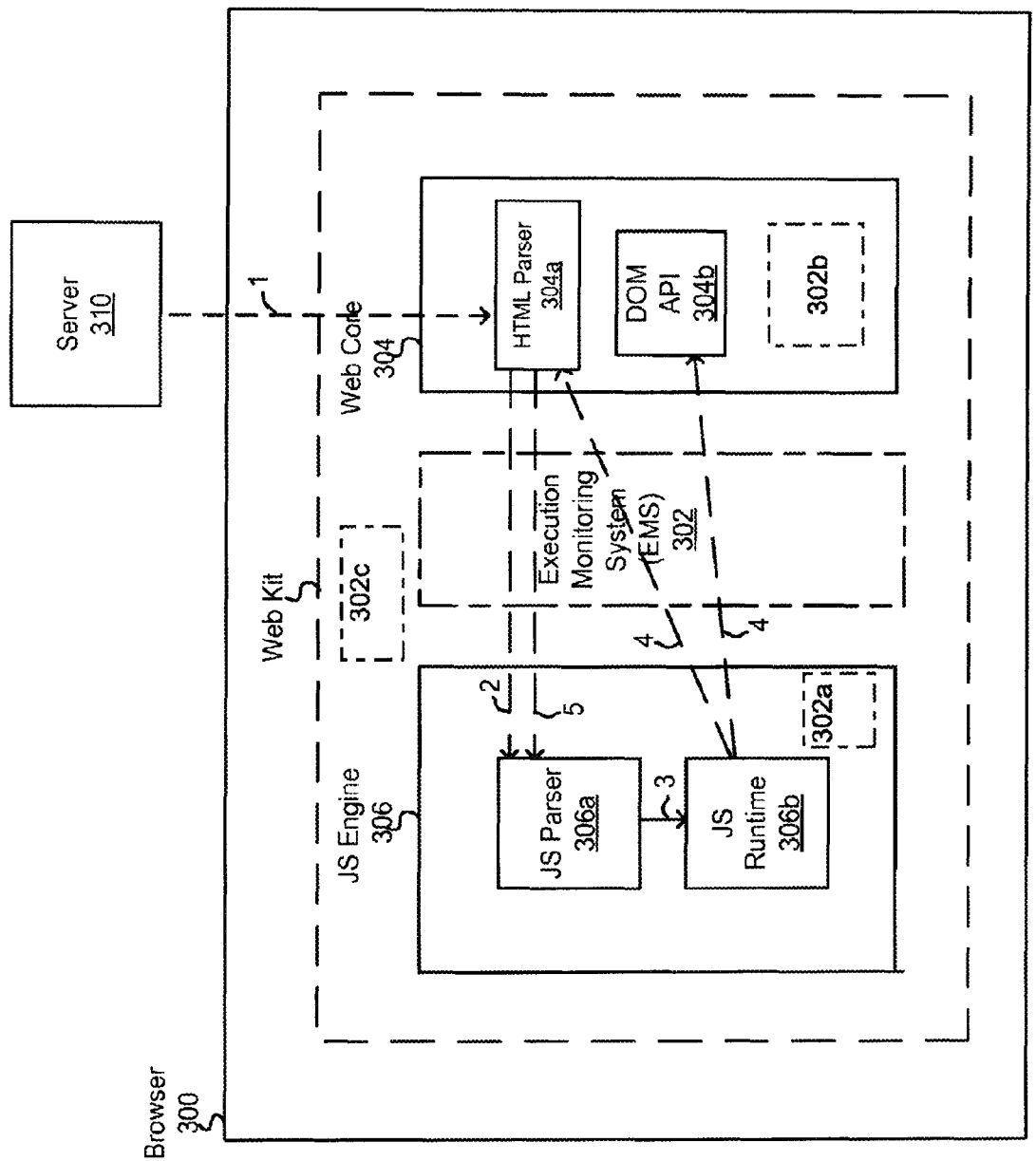
FIG. 4 depicts an Execution Monitoring System (EMS) provided as a part of a Browser in accordance with another embodiment of the invention.

Given the prevalence of web pages, Java Scripts, and browsers in various computing systems that are widely used today, an Execution Monitoring System (EMS) suitable for computing environments that process web pages that can include Java Scripts as executable text is discussed in greater detail below. More specifically, FIG. 4 depicts an Execution Monitoring System (EMS) 302 provided as a part of a browser 300 in accordance with another embodiment of the invention. It should be noted that the EMS 302 can be distributed among various components of the Browser 300, including a Web Core 304 and a JavaScript (JS) Engine 306. As such, executable computer code for the EMS 302 can be distributed among various components or modules of the Browser 300 as will be known to those skilled in the art.

Referring to FIG. 4, the EMS 302 may be incorporated into the Browser 300 using various parts, including 302a, 302b and 302c. Alternatively, the EMS 302 can be provided as an independent or separate component 302 but it may introduce additional overhead. Browser 300 can be effectively implemented by or as a Web Kit. The Web Kit can include the Web Core 304 and JavaScript (JS) Engine 306 which may behave similar to conventional components of a conventional browser. As such, Web Core 304 can handle various tasks pertaining to processing of a web page, including HTML lexing/parsing, Document Object Model (DOM) Management, layout, etc. The JS Engine 306 can handle JavaScript parsing and execution of JavaScripts as will be generally known to those skilled in the art.

Generally, JavaScript can be used to write functions that can be embedded in (e.g. embedded between <script> and </script> tags) or functions that are included in one or more HTML pages and interact with the Document Object Model (DOM) of the page. Some simple examples of this usage are:

Opening or popping up a new window with programmatic control over the size, position, and attributes of the new window (i.e. whether the menus, toolbars, etc. are visible)

Validation of web form input values to make sure that they will be accepted before they are submitted to the server, and Changing images as the mouse cursor moves over them typically in order to draw the user's attention to important links displayed as graphical elements.

Because JavaScript code can run locally in a user's browser (rather than on a remote server), it can be used as more responsive means of processing user actions, thereby making an application feel more responsive. Furthermore, JavaScript code can detect user actions which HTML alone cannot, such as individual keystrokes. To give an example, a "Gmail" application can take advantage of JavaScript code to provide a significant portion of the user-interface logic, and use JavaScript to dispatch requests for information (e.g., dispatch content of an e-mail message) to the server. JS engine 306 can be provided as JavaScript interpreter or JavaScript implementation that interprets JavaScript source code and executes the script accordingly. As a common host environment for JavaScript, web browser 300 can typically use a public API to create "host objects" responsible for reflecting the DOM into JavaScript.

When the Browser 300 requests a new web page (or "page") from a remote server 310, the input page is first passed to the HTML parser 304a in the Web Core 304 (step 1). Thereafter, the HTML parser 304a starts parsing the input page and initiating the operations necessary to construct a DOM tree from the input page. If the HTML parser 304a detects JavaScript code during this process, it passes the JavaScript code to the JS parser 306a (Step 2). JS parser 306a parses the code and initiates its execution through JS Runtime 306b (step 3). During this execution, JS code may attempt to modify the DOM tree, in which case it calls DOM API functions, or modifies the HTML page, for example, by calling "Document.write( )" function, in which case the modifications will be passed to the HTML parser (step 4). When the HTML parser 304a gets an input from JS engine 306 as an attempt to modify the HTML page, it processes this input as any other part of the page. This input may cause Web Core 304 to create new DOM nodes and/or to invoke the JS parser 306a if it detects a JavaScript code, for example provided between "<script>" and </script> tags. In other words, JavaScript code can write new JavaScript codes into the HTML page and the HTML parser can send the newly generated JavaScript code to JS Engine 306a for execution (step 5). Conventionally, JS Engine 306a would not be able to distinguish between the newly generated JavaScript code from JavaScript code originally present in the page.

However, it will be appreciated that EMS 302 can effectively detect JavaScript code originated from "tainted" text in the page by monitoring "tainted" text. This means that the Browser 300 can be operable to effectively "taint" data that comes from potentially suspicious sources and store "taint" information along with the original data. Furthermore, the Browser 300 can effectively propagate "taint" information through any processing and modifications of a web page. For example, if a new node is created or an existing node is modified in a DOM tree using "tainted" data, the new or modified node can be marked as tainted. As another example, if a JavaScript variable is computed from "tainted" data, the JavaScript variable is considered to be "tainted" too. Given the serious threat that cross-site scripting (XSS) attacks pose today, "tainting" and "taint" tracking mechanism that are especially suited to address XSS attacks are discussed in greater detail below.

In XSS attacks, code injected into a web application can be under the control of an attacker. For a DOM-based cross site scripting (XSS) attack, the prerequisite is that a vulnerable web application uses data sources which an attacker can easily influence. Fortunately, these data sources seldom contain executable scripts. Thus, by preventing execution of content of the data sources, DOM-based XSS attacks can be addressed in a very significant way. To this end, a mechanism that can keep track of how data in used in the Browser 300 can identify data sources that can be easily altered by an attacker (or "suspicious sources"). Those skilled in the art will appreciate that "suspicious sources" can, for example, include data sources associated with one or more of the following: "Document.URL," "Document.URLUnencoded," "Document.location" (and many of its properties), "Document.referrer," and "Window.location" (and many of its properties). In addition, those skilled in the art will realize that one or more "suspicious sources" can be hardcoded in the Web Core 304 and/or read from a configuration file.

In any case, the EMS 302 can, for example, be operable to "taint" all the data from suspicious sources in the web browser 300 when the data is accessed. In particular, variables corresponding to suspicious sources in JS engine 306 can be tainted and the taint information can be propagated along the execution path. This can be achieved by extended the data structure classes in a WebKit, and in particular, by adding a Boolean variable to identify whether an object is tainted and adding two functions, taint( ) and is Tainted( ) to each of the data structure classes.

The first function, taint( ) sets the Boolean value of its subject to true. In other words, it taints the object.

The second function, is Tainted( ) returns the Boolean value of its subject, i.e., reports whether that object is tainted.

As noted above, the taint information can be propagated along execution paths. For example, "Strings" in JavaScript are managed using a "JSString" class, which is a subclass of a "JSCell" class. If the JavaScript code tries to change the URL, the execution path for this operation involves many functions from different classes and touches many different class objects. To be more specific, "JSString," "JSCell," "JSValue," and "UString" classes of JS Engine 306, as well as "String," "SegmentedString," "KURL", and "Node" classes of the Web Core 304 cab take a role in this process. As such, if the initial data (i.e., the "JSString") object is tainted, then this taint can be propagated through the entire path in accordance with the described embodiment. This propagation may require minor modification of all of class objects and associated functions as a function may just need to check whether its operands are tainted (e.g., via calling a "isTainted( )" function on the operands) and be able to taint its result if any of the operands are tainted.

There are several cases of JavaScript operations that could propagate the taint information. Exemplary cases include:

(i) assignments: left operand is tainted if the right operand has been tainted;

(ii) arithmetic and logic operations: the computed result is tainted if any of the operands has been tainted:

(iii) function calls: since JavaScript passes arguments by reference, body of the function may not have to be treated specifically. The taint information can be stored in objects and would be propagated automatically inside the function body as long as the assignments and arithmetic/logic operations are considered (iv) control flow: in a few cases, some statements depend on the value of tainted variables. For example, the tainted variable is the value to be tested in the "IF" statement. However, there may be no need to take special consideration for control flow since DOM-based XSS can be effectively prevented as long as the taint information of suspicious sources is correctly propagated.

It should be noted that "taint" propagation can be considered in construction or modification of the DOM for a Web page. As a simple example, a tainted variable can be assigned to a node in a DOM tree and the node can be accessed by JavaScript later and modified as a result. In this case, the DOM node can be tainted to guarantee that the information flow path is preserved.

These measures can prevent execution of illegitimate and potentially harmful scripts when a web page is processed. Referring back to FIG. 4, HTML parser 304a can be prevented from passing illegitimate scripts (i.e., scripts that originate from suspicious data) to the JS parser 306b (step 5). HTML parser 304a can check the taint data of any scripts (i.e., taint of an associated DOM node) before passing it to the JS parser. If the data is tainted, Web Core 304a can take remedial action, for example, by treating the script as a regular text value instead of a script, displaying whitespaces, logging the script, or simply ignoring it. If the script is not tainted, the HTML parser 304a can pass it to the JS Engine 306 for execution. As will be readily apparent to those skilled in the art, the EMS 302 can be effectively provided at least in part as a component of the Web Core 304 even though it is depicted as a separate component in FIG. 4.

As noted above, a document (e.g., a web page) can be pre-marked with "untrusted" data (e.g., tainted data) when the document is obtained by a computing system operable to track and effectively propagate the "untrusted" mark. For a web page, a web server can be operable to mark data not trusted or fully trusted as "untrusted" data, and a client machine can tract the "untrusted" content and propagate the "untrusted" mark in accordance with the principles described above. This "hybrid" approach evolving both client and server sides may provide a better protection against XSS attacks than just taking measures on the client side. Techniques for marking "untrusted" data are described in greater detail below.

Marking "Untrusted" Content

Generally, content that is not trusted or not fully trusted can be marked as "untrusted" content. By way of example, a computer system can be operable to mark text or textual content in a document (e.g., web page) as "tainted" text when the document can include executable text.

Figure 5A:
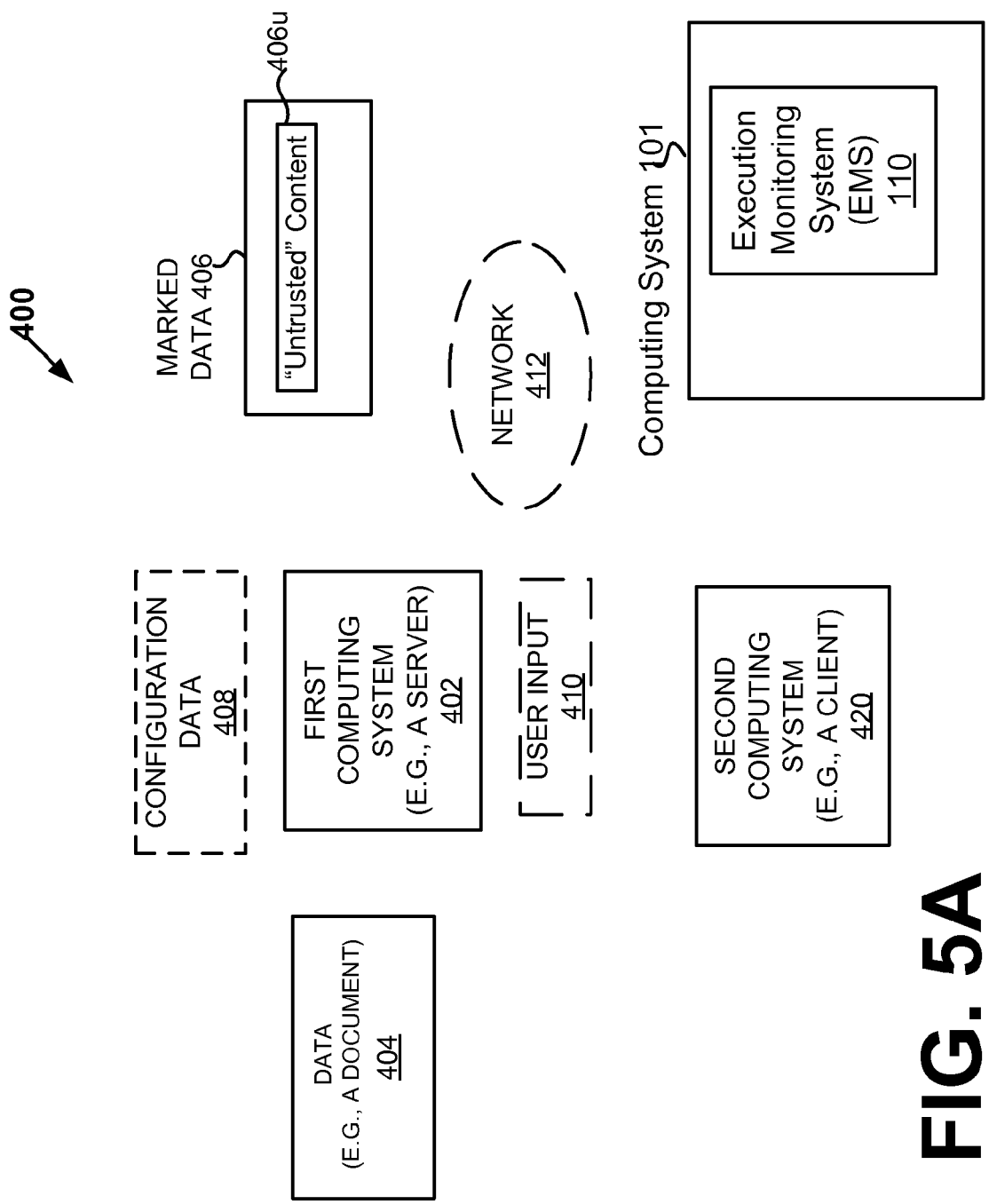
FIG. 5A depicts a first computing system in a communication environment 400 in accordance with one embodiment of the invention.

To elaborate, FIG. 5A depicts a first computing system 402 in a communication environment 400 in accordance with one embodiment of the invention. Referring to FIG. 5A, the computing system 402 can be operable to effectively manage data (or content) 404 that may include non-executable content and executable content executable when data 404 is processed. Today, data 404 is predominately provided as a document (e.g., a web page) that can include executable text. As such, the embodiment depicted in FIG. 5A will be further discussed in the context of data 404 being provided as a document (404) that can include executable content (e.g., executable text).

Referring to FIG. 5A, the computing system 402 can also be operable to mark text deemed not trusted or not fully trusted as "untrusted" content 406u in a marked data 406 which can, for example, be provided as marked document 406. It should be noted that the computing system 402 can be operable to obtain configuration data 408 and/or user input 410. Moreover, the computing system 402 can be operable to identify content in the document 404 to be marked as the "untrusted" content 406u. By way of example, configuration data 408 can identify general and/or specific categories of content to be marked as the "untrusted" content 406u. Categories of content deemed not to be trusted or not fully trusted can, for example, include data provided by users, and data obtained from external sources (e.g., external databases, or web sites). As another example, when the document 404 is a web page owned and/or managed by an entity, any content not directly provided by the entity can be considered "suspicious" and therefore marked as "untrusted" data by the first computing system 402. As will be appreciated by those skilled in the art, the first computing system 402 can be operable to identify the "untrusted" content 406u without requiring user input 410. As such, the first computing system 402 can be programmed (e.g., hardcoded, pre-programmed) to automatically search the document 404 and/or use the configuration data 408 to identify the "untrusted" content 406u without requiring further input (e.g., user input 410). However, the first computing system 402 can be operable to identify the "untrusted" content 406u based on input, including the user input 410 which can, for example, be provided by a person (e.g., a web site administrator) via a user interface (e.g., keyboard and display) (not shown).

In any case, the first computing system 402 can identify "untrusted" content in the document 404 and effectively mark it in the marked document 406 as the "untrusted" content 406u, thereby allowing other computing systems to identify the "untrusted" content 406u text as content (e.g., text in web page) not to be trusted or not to be fully trusted solely based on the content of the document 404. As such, the "untrusted" content 406u can be identified by a second computing system 420 in the communication environment 400 shown in FIG. 5A. Referring to FIG. 5A, the second computing system 420 can, for example, operable to obtain the marked document 406 via a network or computer network (e.g., the Internet) 412. As such, the second computing system 420 can, for example, be or behave as a client or client device operable to load the marked document 406 as a web page with the "untrusted" content 406u marked in the web page as content not be trusted or fully trusted. In this context, the first computing system 402 can be a server or server device marking the "untrusted" content 406u in the web page and make the web page available via the network 412. Although computing systems 402 and 420 are depicted as separate entities and can, for example, be provided as server and client devices, it will be appreciated that the operations described with respect to computing systems 402 and 420 can be performed respectively by two applications or processes which may both be operable on the same computing system or device. This means that a first process or application may be operable to mark the document 404 for processing by a second first process or application also operable on the same device. This device can, for example, be provided as a personal computer (PC) or a consumer electronic (CE) device that includes a web server and a browser as will be readily known to those skilled in the art.

The "untrusted" content 406u marked in the "untrusted" content 406u allows the second computing system 420 to identify content in the (marked) document 406 marked as content not to be trusted or fully trusted solely based on the mark document 406 itself. In other words, computing system 402 can be operable to identify "untrusted" content solely based on the marked document 406 without requiring external data (e.g., a separate configuration file). During the processing of the marked document 406, the second computing system 420 can be operable to identify executable content (e.g., executable text in form of a script) marked in the document 406 as "untrusted" content 406u and take appropriate action. As a result, the second computing system 420 can, for example, deny execution of executable content, including executable code marked in the document as "untrusted" content 406u. As another example, executable code marked as "untrusted" content 406u may be treated as non-executable text. In addition, any type of rich formatting and tags provided as part of "untrusted" content 406u may be effectively ignored. Generally, the second computing system 420 can identify content marked as "untrusted" content 406u and take any action deemed appropriate for processing the document. As such, the second computing system 420 can, for example, be programmed (or pre-programmed) to take action, determine an action to be taken based on the type or nature of the marked document 406 and/or input including static preferences and interactive input provided by a user as will be readily know to those skilled in the art.

It will also be appreciated that a computing system with an Execution Monitoring System (EMS) can be operable to obtain the marked document 406 and process the document in accordance with the principles of the techniques described above. By way of example, referring back to FIG. 5A, a computing system 101 with an EMS 110 (also shown in FIG. 2A) can be operable to obtain the marked document 406 as a web page with textual content effectively marked as "untrusted" content 406u. As noted above, during the processing of the document 406a, the computing system 101 can be operable to mark other content of the document 406 that may have been derived and/or affected by the untrusted content" 406u. By way of example, text marked in the document 406 as "untrusted" content 406u can be considered to be "tainted" text. As such, during the processing of the document 406, a "tainted" mark may be effectively propagates to other textual content determined to have been derived and/or affected by the "untrusted content" 406u.

It should be noted that "untrusted" content can, for example, be marked by an indicator provided as an extension of a particular used to describe or write content in a document ("language extender") in accordance with the principles of the invention. By way of example, a new HTML tag can be provided to mark untrusted text in a web page. In addition, one or more attributes (or parameters) regarding the "untrusted" content can be provided. As will be discussed in greater detail below, one or more attributes can be provided in connection with a language extender indicative of "untrusted" in a document.

By way of example, a "length attribute" can be indicative of the length of untrusted text marked with a new HTML tag in a web page. As another example, an integrity attribute can be provided as an "integrity value" (e.g., checksum, digest) of the "untrusted" content in connection with the new HTML tag. Generally, it will be appreciated that one or more attributes can be provided in a document regarding the content marked in the document as "untrusted" content, thereby making it more difficult to hide or change content that is not be fully trusted.

Figure 5B:
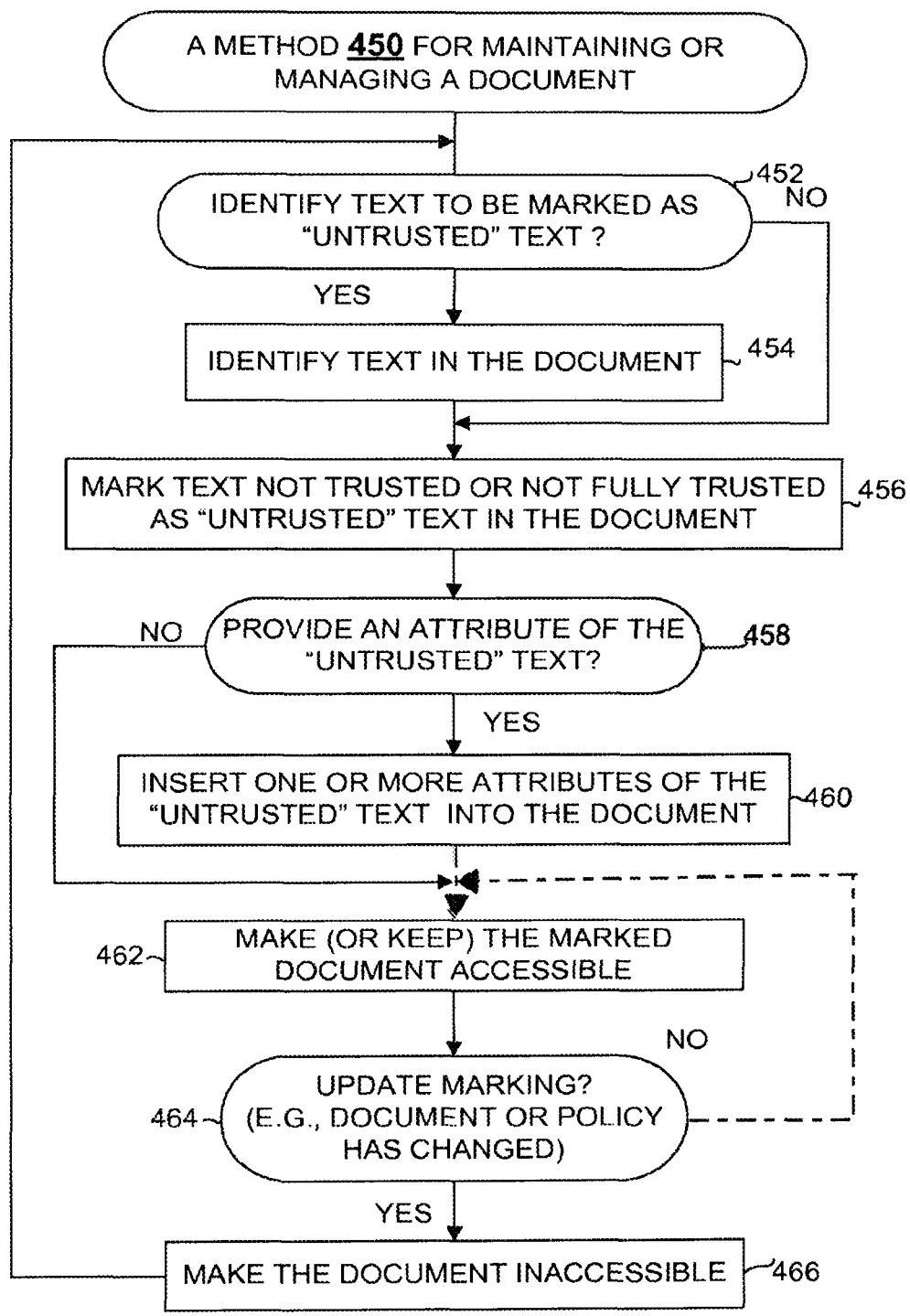
FIG. 5B depicts a method for maintaining or managing a document in accordance with one embodiment of the invention.

FIG. 5B depicts a method 450 for maintaining or managing a document in accordance with one embodiment of the invention. Method 450 can, for example, be performed by the computing system 402 (depicted in FIG. 5A). It should be noted that the document can be inaccessible or can be made inaccessible before method 450 is initiated. Referring to FIG. 5B, initially, it is determined (452) whether to identify text in the document as text not trusted or not fully trusted. Accordingly, text in the document can identified (454), for example, by searching the document to identify data (e.g., input parameters) deemed not to be trusted or not fully trusted. However, it can be determined (452) not to identify text in the document to be marked as "untrusted" text, for example, when text has been identified or can be identified directly based on input (e.g., user input provided by a person). In any case, text not trusted or not fully trusted can be marked (456) in the document as "untrusted" text. As a result, one or more textual portions of the document can be marked (456). Thereafter, it can be determined (458) whether to provide an attribute regarding any one of the textual portions marked as "untrusted" text. This determination (458) as well as the determination (454) of whether to identify text can represent a design choice or made be made based on one or more criteria (e.g., type of the document and/or textual content, user preference, user input). In any case, if it is determined (458) to provide an attribute for the "untrusted" text, one or more attributes (e.g., a length attribute, a digest value) can be inserted (460) in the document respectively for one or more textual portions marked as "untrusted" text. Thereafter, the marked document can be made (462) accessible. However, it should be noted that the document can be reassessed for marking text as "untrusted" content. Referring back to FIG. 5B, if it is determined (464) to update marking of "untrusted" text in the document, the marked document can be made (468) inaccessible. Thereafter, method 450 can proceed in a similar manner as discussed above to mark the document before the document is made assessable (462) again.

It will be appreciated that the described techniques are especially suited for providing and processing web pages. In particular, providing a "language extender" with one more attributes regarding "untrusted" content is especially suited for processing web pages. To further elaborate, FIG. 6A depicts a very simple web application that can generate a web page using an input parameter, namely, a "uName" parameter. For benign "uName" values (e.g., "Alan"), the web application can safely generate a web page without any illegitimate scripts being executed. However, an attacker may be able to change the "uName" value to a malicious executable script, namely:

"<script> evil( )</script>"

The resulting page is depicted in FIG. 6A as "a real page" with the input parameter "uName" having being exploited. This vulnerability is at least partly due to the inability of conventional web browsers to distinguish illegitimate and legitimate scripts encountered during the processing of a web page.

Web browsers typically operate on a client (or client side) operable to obtain the web page from a server (or server side). In accordance with principals of the invention, an HTML extension can effectively allow server side applications to pass necessary information to the client side, thereby allowing the clients to identify illegitimate scripts. More particularly, a new HTML tag (e.g., a "<userinput>" HTML tag) can be added to the existing set of HTML tags in accordance with one embodiment of the invention. This new HTML tag can, for example, be used by a server on behalf of a web server to mark "untrusted" content (e.g., input or data provided by an entity other than the web server). In addition, a length attribute (e.g., "userinput length") can be provided for this new HTML tag to indicate the length of the "untrusted" content delineated by the new tags. It will be appreciated that the length attribute can help avoid bypassing the intended functionality of the new HTML tag. Otherwise, the intended functionality of the new HTML tag may be bypassed by placement of an end tag (e.g., "</userinput>").

To further elaborate, FIG. 6B depicts use of a new HTML tag and length attribute in a web application in accordance with one embodiment of the invention. Referring to FIG. 6B, the length of "untrusted" textual content is assigned a number of characters, namely 24 characters, as a length attribute ("userinput length") of the HTML tag "<userinput>" indicative of "untrusted" textual content. It should be noted that that the "<userinput>" tag and length attribute (or attribute) can be replaced by even shorter strings and/or the end </userinput> tag can be removed to further reduce the overhead as will be appreciated by those skilled in the art. Moreover, tag and length attributes can be encoded using byte values, for example, from a Unicode Character Database as will also be appreciated by those skilled in the art. Given that a set of byte values can be rendered as whitespaces in existing browsers, implementation of a new HTML tag and attributes (e.g., "<userinput>" tag and length attributes) would not adversely affect the behavior of a browser not designed to recognize an HTML tag or attributes provided in accordance with the invention. For example, the server can encode a tag "<userinput length=24>" as a fixed sequence of UCD byte values (e.g., four (4) to five (5) characters) to indicate "untrusted" user input and then encode the number twenty four (24) in a binary or octal format using a set of byte values.

Generally, a server can be operable to mark each and every piece of suspicious data using a new HTML tag with possibly one or more attributes pertaining to the suspicious data. For example, a server can be operable to mark data read from a database, especially when the database can be used by an attacker to insert malicious data, and the server could report part of the data it reads as part of a web page the servers provides. Such data can be marked by a server, for example, using a "<userinput>" HTML tag as described above. To enhance security further, a server can be operable to effectively mark in its web page(s) every piece of external data (e.g., data that does not belong to the template of a web page).

On a client side, when a browser obtains a web page with content marked as "untrusted," the browser can be operable to essentially parse the page conventionally. However, the browser can handle any data marked as "untrusted" differently. For example, the browser can be operable to treat "untrusted" executable text as non-executable text or merely as text. As a result, the browser may not ultimately allow execution of "untrusted" executable text, rich formatting, or even recognize any tags. To achieve this, a browser parser can, for example, be operable to create leaf nodes in a DOM structure whenever it encounters a tag indicative of "untrusted" data (e.g., a "<userinput>" HTML tag). The browser can then directly copy the marked data even without parsing/lexing the marked data, as will be appreciated by those skilled in the art. As another example, rich content (e.g., tags like <i> and <b>) in user generated input can be processed, but processing of scripting content in user generated input can be disallowed. As such, when the HTML parser gets a web page, the parser can, for example, mark the DOM nodes (and the corresponding objects in these nodes) that are generated and/or affected by the data enclosed in "<userinput>" tags and disallow execution of any scripts originated from marked DOM nodes.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of maintaining or managing a document obtained by a computing system operable to process and execute executable text in the document, the computer-implemented method comprising:
    marking the document, by a server, of text in the document as untrusted text to indicate that the text is not trusted or is not fully trusted via marked textual portions of the document, wherein a client device receives the marked document to identify the untrusted text in the document solely based on the document;
    wherein the marking of the untrusted text by the server comprises: marking the untrusted text by a hypertext markup language (HTML) extension to permit the client device to determine at least one action for the marked document,
    wherein the marking of the untrusted text comprises: providing in the document one or more attributes of the untrusted text, the attributes comprise one or more of a length attribute and an integrity attribute, and the integrity attribute is associated with an integrity value, the integrity value providing an indication of trustworthiness, and the length attribute is indicative of a length of untrusted text marked with a new HTML tag in a web page.

2. The computer-implemented method of claim 1, wherein the computer-implemented method further comprises:
    identifying in the document the text not trusted or not fully trusted as the untrusted text;
    the client device using the marking to:
        determine remedial actions to safely execute a subset of the marked text.

3. The computer-implemented method of claim 2, wherein the untrusted text includes an executable text portion, a non-executable text portion, or an executable test portion and a non-executable text portion that is replaceable by a second executable text portion executable by the client device when the document is processed or is being processed by the client device.

4. The computer-implemented method of claim 2, wherein the computer-implemented method further comprises:
    obtaining the document by the client device; and
    the client device implements the steps of:
        not executing executable text marked in the document as the untrusted text;
        processing the executable text as non-executable text;
        not allowing rich formatting of the executable text; and
        not processing tags of the executable text.

5. The computer-implemented method of claim 1, wherein the identifying of the text in the document comprises one or more of the following:
    determining the text not to be trusted or not to be fully trusted as the untrusted text; and
    determining at least partly based on input data the untrusted text, wherein the input data includes at least one of: configuration data, user input, and one or more user preferences.

6. The computer-implemented method of claim 1, wherein the marking marks the untrusted text before allowing the document to be obtained by the client device.

7. The computer-implemented method of claim 1, wherein the untrusted text includes one or more of the following: text provided by or received from another computing system, text associated with input, and text associated with user input.

8. The computer-implemented method of claim 1, wherein the document includes a web page, and wherein the language extension is an HTML extension provided with the length attribute indicative of length of the untrusted text such that the server marks the document via the HTML extension to indicate portions of the text based on the length of the portions that are untrusted.

9. The computer-implemented method of claim 1, wherein the computer-implemented method further comprises performing by the client device the following steps to address propagation of tainted text:
   determining whether executable text in the document has been derived from, affected by, or derived from and affected by the untrusted text marked in the document; and
   identifying the executable text as untrusted text not to be trusted or not fully trusted when the determining determines that the executable text has been derived from, affected by, or derived from and affected by untrusted text in the document.

10. The computer-implemented method of claim 1, wherein the computer-implemented method further comprises performing by the client device the following steps to address propagation of tainted text:
    effectively tracking the untrusted text marked in the document during the processing of the document; and
    marking, based on the tracking of the untrusted text, other content in the document determined to be derived from, affected by, or derived from and affected by the untrusted text as untrusted content.

11. A communication or computing environment, comprising:
    a first computing system including both hardware and software that includes a server operable to: mark text in a document as untrusted text to indicate that the text is not trusted or is not fully trusted and form a marked version of the document, wherein a second computing system that is a client device identifies the text in the marked document as the untrusted text solely based on the marked document;
    wherein the document is marked by hypertext markup language (HTML) extension to permit the second computing system to determine at least one action for the marked document,
    wherein marking of the untrusted text includes providing in the marked document one or more attributes of the untrusted text,
    wherein the attributes comprise one or more of a length attribute and an integrity attribute, and
    wherein the integrity attribute is associated with an integrity value, the integrity value providing an indication of trustworthiness, and the length attribute is indicative of a length of untrusted text marked with a new HTML tag in a web page.

12. The communication or computing environment of claim 11, further comprising:
    the second computing system, wherein the second computing system is operable to:
       obtain the document; and
       not execute executable text in document marked as the untrusted text.

13. The communication or computing environment of claim 11, wherein the document includes a web page, the first computing system is or includes a server, and the second computing system is or includes a client.

14. The communication or computing environment of claim 11, wherein the second computing system is further operable to:
    determine whether executable text in the document has been derived from, affected by, or derived from and affected by the untrusted text marked in the document; and
    identify the executable text as untrusted text not trusted or not fully trusted when the determining determines that the executable text has been derived from, affected by, or derived from and affected by untrusted content in the document.

15. A computer readable storage device storing at least executable computer code for maintaining or managing a document obtained by a computing system operable to process and execute executable text in the document, wherein the computer readable storage device includes:
    executable computer code for a server to mark text in the document as untrusted text to indicate that the text is not trusted or is not fully trusted and form a marked version of the document, wherein a second computing system that is a client device identifies the untrusted text in the marked document solely based on the marked document wherein the document is marked by hypertext markup language (HTML) to permit the second computing system to determine at least one action for the marked document,
    wherein marking of the untrusted text includes providing in the marked document one or more attributes of the untrusted text, and the attributes comprise one or more of a length attribute and an integrity attribute, and
    wherein the integrity attribute is associated with an integrity value, the integrity value providing an indication of trustworthiness, and the length attribute is indicative of a length of untrusted text marked with a new HTML tag in a web page.

16. The computer readable storage medium of claim 15, wherein the computer readable storage medium further includes:
    executable computer code to determine whether executable text in the document has been derived from, affected by, or derived from and affected by the untrusted text marked in the document; and
    executable computer code to identify the executable text as untrusted text not trusted or not fully trusted when the determining determines that the executable text has been derived from, affected by, or derived from and affected by untrusted text in the document.

17. The computer readable storage medium of claim 16, wherein the executable computer code to mark the text is provided as a executable computer code for a first application or process, the executable computer code for the determining and identifying is provided as a executable computer code for a first application or process, and the first and second applications or processes are operable on the same computing system, computing device, or computing system and computing device.

18. A computing system comprising:
    a client device that includes both hardware and software, the client device receives a document that includes text marked as untrusted text which indicates that the text is not trusted or is not fully trusted, identifies the untrusted text in the document solely based on the document, and determines at least one action for the marked document, wherein the marked untrusted text includes one or more attributes of the untrusted text, the attributes comprise one or more of a length attribute and an integrity attribute, and the integrity attribute is associated with an integrity value, the integrity value providing an indication of trustworthiness, and the length attribute is indicative of a length of untrusted text marked with a new hypertext markup language (HTML) tag in a web page.

* * * * *